United States Patent
Shih (10) Patent No.: US 9,021,579 B2
(45) Date of Patent: Apr. 28, 2015

(54) SMARTPHONE DATA BACKUP AND RESTORATION SYSTEM

(71) Applicant: Sheng-Yuan Shih, Taipei (TW)

(72) Inventor: Sheng-Yuan Shih, Taipei (TW)

( * ) Notice: Subject to any disclaimer, the term of this patent is extended or adjusted under 35 U.S.C. 154(b) by 0 days.

(21) Appl. No.: 14/275,906

(22) Filed: May 13, 2014

(65) Prior Publication Data

US 2014/0250324 A1   Sep. 4, 2014

Related U.S. Application Data

(63) Continuation-in-part of application No. 13/472,957, filed on May 16, 2012, now abandoned.

(30) Foreign Application Priority Data

Jul. 5, 2011   (TW) .............................. 100212250 U (51) Int. Cl.
| | |
|---|---|
| *G06F 21/00* | (2013.01) |
| *G06F 11/14* | (2006.01) |
| *G06F 21/42* | (2013.01) |
| *G06F 1/16* | (2006.01) |
| *H04L 29/08* | (2006.01) |
| *H04M 1/725* | (2006.01) |

(52) U.S. Cl.
CPC ............ *G06F 11/1412* (2013.01); *G06F 21/42* (2013.01); *H04L 67/1095* (2013.01); *H04L 67/1097* (2013.01); *G06F 1/1632* (2013.01); *G06F 11/1456* (2013.01); *G06F 11/1461* (2013.01); *G06F 11/1469* (2013.01); *H04M 1/72527* (2013.01)

(58) Field of Classification Search
CPC .............................. G06F 21/121; G06F 21/42
USPC ............... 380/270; 455/411, 414, 419.1, 588; 713/189, 193, 300
See application file for complete search history.

(56) References Cited

U.S. PATENT DOCUMENTS

| | | | | |
|---|---|---|---|---|
| 8,209,540 | B2 * | 6/2012 | Brouwer et al. | ............... 713/180 |
| 2009/0210738 | A1 * | 8/2009 | Kimura | ........................... 713/340 |
| 2010/0317401 | A1 * | 12/2010 | Lee et al. | ........................ 455/557 |
| 2011/0306326 | A1 * | 12/2011 | Reed et al. | ................. 455/414.1 |

* cited by examiner

*Primary Examiner* — Hadi Armouche
*Assistant Examiner* — Hee Song
(74) *Attorney, Agent, or Firm* — Leong C. Lei (57) ABSTRACT

A Smartphone data backup and restoration system on a physical layer is connected to a Smartphone through a data transmission line, and the data backup and restoration system and the Smartphone are identified and paired by a datalink layer and a network layer, and then a transport layer transmits an identification program to the Smartphone, and a session layer completes a trusted connection according to a TCP communication and transmission protocol such as USBMUXD, ADB, MTP, and PTP, so that the Smartphone is capable of performing a data transmission operation including data backup and restoration at a presentation layer and an application layer to improve the convenience of operation and use.

3 Claims, 8 Drawing Sheets

SMARTPHONE DATA BACKUP AND RESTORATION SYSTEM

CROSS-REFERENCE TO RELATED APPLICATIONS

This application is a continuation-in-part patent application of U.S. application Ser. No. 13/472,957 filed on May 16, 2012, the entire contents of which are hereby incorporated by reference for which priority is claimed under 35 U.S.C. §120.

BACKGROUND OF THE INVENTION

1. Field of the Invention

The present invention relates to the technical area of Smartphone accessories, and more particularly to a Smartphone data backup and restoration system connected to a Smartphone through a cable directly, so that the Smartphone can perform operations including pairing, data backup and data restoration.

2. Description of the Related Art

As Smartphone becomes popular and comes with diversified functions, more and more people use it for the purposes of connecting to the Internet, taking pictures, listening to music, watching movies, sharing information, etc. Although Smartphone improves the convenience of our life, the data stored in the Smartphone becomes increasingly larger, and there are issues such as the privacy of a user and the confidentiality of data to be overcome.

At present, Smartphone is generally divided into two main systems, respectively: the iPhone OS (iOS) system developed by Apple Computers and the Android system developed by Google, and the data of these two systems are incompatible to each other, so that these two main systems develop their own proprietary application programs.

Since the storage capacity of the Smartphone is generally more than 16G, users usually establish the habit to store data in their mobile phone, and sort out or delete the data stored the mobile phone unless it is absolutely necessary.

In view of the aforementioned using habit of the users, most users do not periodically back up their data in the Smartphone, so that when the Smartphone breaks down or is missing, the data may be leaked to the outside or even lost completely.

Both of the aforementioned two main systems provide a cloud space such as iCloud and Google accounts for the data backup and data restoration functions. However, the cloud space requires network packets for the transmission, and thus the data may be intercepted or transmitted improperly, and the data backup or restoration may be unable to execute. In addition, if it is necessary to save the data stored in the Smartphone into a personal computer, the data can be stored via a network connection. If the data backup is performed in the same computer, the data in the Smartphone may be backed up alternately or even incorrectly. To overcome this problem, it is necessary for users to purchase additional computer equipments for the data backup of the Smartphone, and thus incurring higher cost and inconvenience.

SUMMARY OF THE INVENTION

In view of the aforementioned problems of the prior art, it is a primary objective of the present invention to overcome the problems by providing a Smartphone data backup and restoration system capable of performing an operation such as authentication, data backup and data restoration through various types of Smartphones and performing a backup job of multiple copies of data for different types of Smartphones through a data storage unit of the Smartphone data backup and restoration apparatus.

To achieve the aforementioned objective, the present invention provides a Smartphone data backup and restoration system, comprising: a Smartphone, having a first port and a touch screen, and further including an operating system and a backup program installed in the Smartphone, and the touch screen being operated to run the backup program to issue a control command and display an interactive status of an operation; a data transmission line, having a first connector and a second connector, wherein the first connector is electrically coupled to the first port; and a data backup and restoration apparatus, coupled to an external power supply for use, and having an identification tag corresponding to the operating system, and coupled to the Smartphone through the data transmission line, and the data backup and restoration apparatus comprising: a housing, having a containing space therein; a second port, formed on a surface of the housing, for electrically coupling the second connector of the data connection line; a microprocessor, installed in the containing space, and electrically coupled to the second port, for performing a corresponding operation after receiving the control command; a data storage unit, installed in the containing space, and electrically coupled to the microprocessor, for storing a verification program, and backup data coming from the Smartphone; a buffer unit, installed in the containing space, and electrically coupled to the data storage unit (or microprocessor), for storing data temporarily during the operation of the microprocessor; and a display unit, installed on a surface of the housing, and electrically coupled to the microprocessor, for instantly displaying an operating status of the data backup and restoration apparatus; and the Smartphone when used being electrically coupled to the data backup and restoration apparatus through the data transmission line and performing a pairing job of the operating system, wherein if the pairing job succeeds, then the data backup and restoration apparatus will run the verification program to duplicate data to the Smartphone synchronously to complete a trusted connection, so that the backup program installed in the Smartphone will control the data backup and restoration apparatus to perform a backup or restoration job, and if the pairing job fails, then the data backup and restoration apparatus will not take any action, but will simply display an error status of the operation by the display unit.

In a preferred embodiment, the Smartphone data backup and restoration system of the present invention further comprising a reset switch installed on a surface of the housing and electrically coupled to the microprocessor, wherein the reset switch is disposed on a side (or a different side) of the second port, so that after the reset switch is pressed, a trusted connection is completed forcibly, while the backup job of the Smartphone is being performed, and the backup data are duplicated into the data storage unit. Wherein, the reset switch is a press-button switch or a push switch. When a user wants to enable a repair mode, the user may press the reset switch to forcibly execute a backup job, and the Smartphone is reset to its factory default setting.

In addition, the display unit of the present invention is an LED light source or an LCD display device for displaying an operating status and a power level.

DETAILED DESCRIPTION OF THE PREFERRED EMBODIMENTS

The technical content of the present invention will become apparent with the detailed description of preferred embodiments and the illustration of related drawings as follows.

Figure 1:
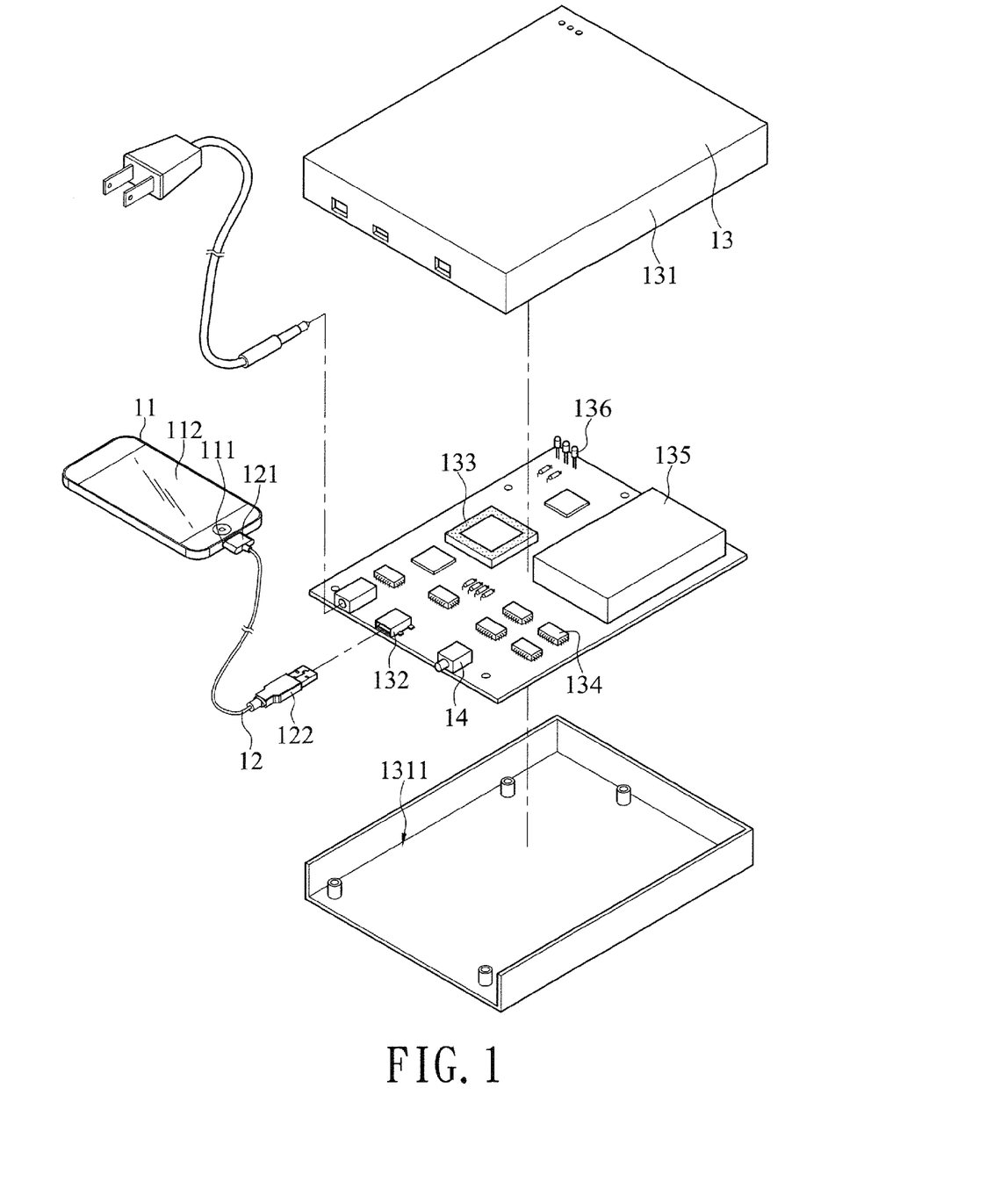
FIG. 1 is a schematic view of the structure of a preferred embodiment of the present invention.
Figure 2:
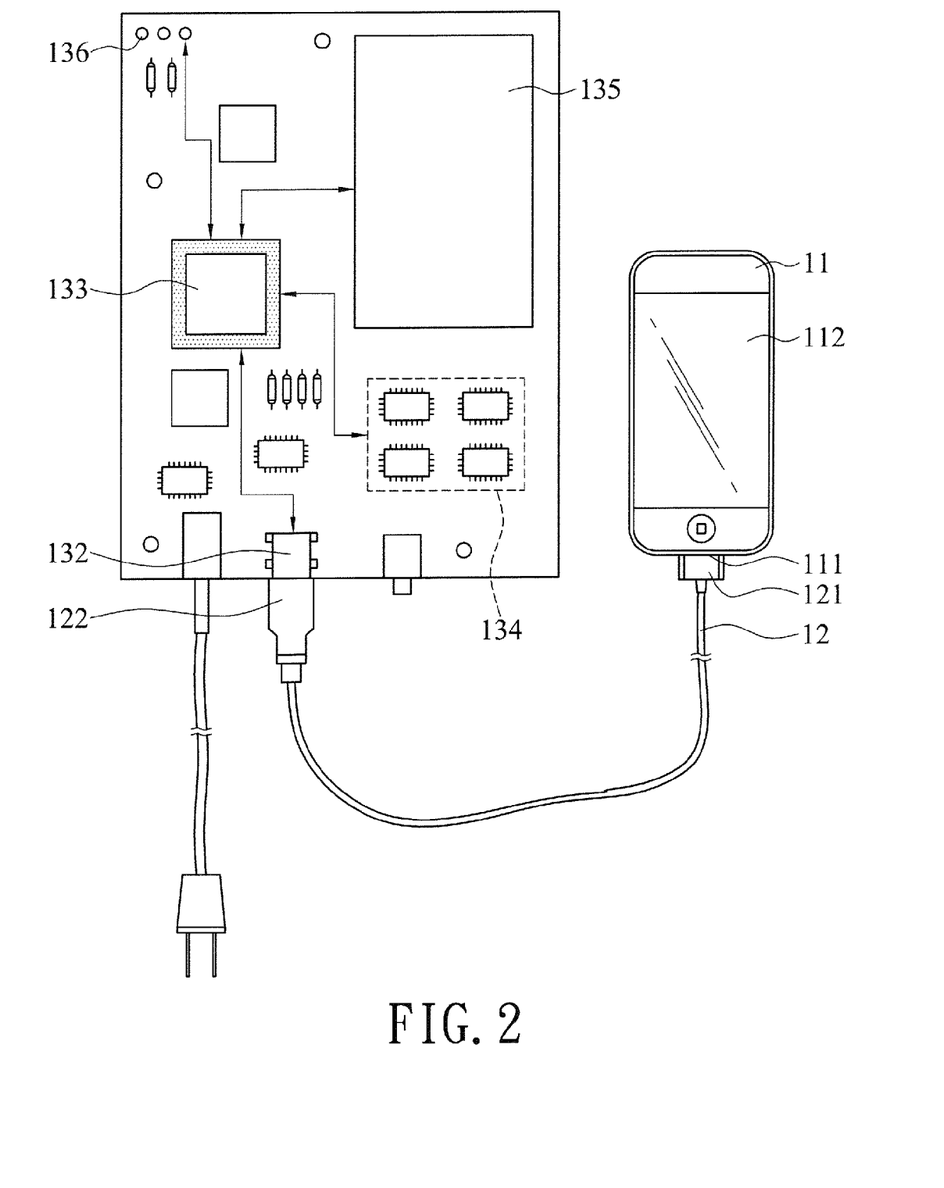
FIG. 2 is a schematic view of the system architecture of a preferred embodiment of the present invention.
Figure 3:
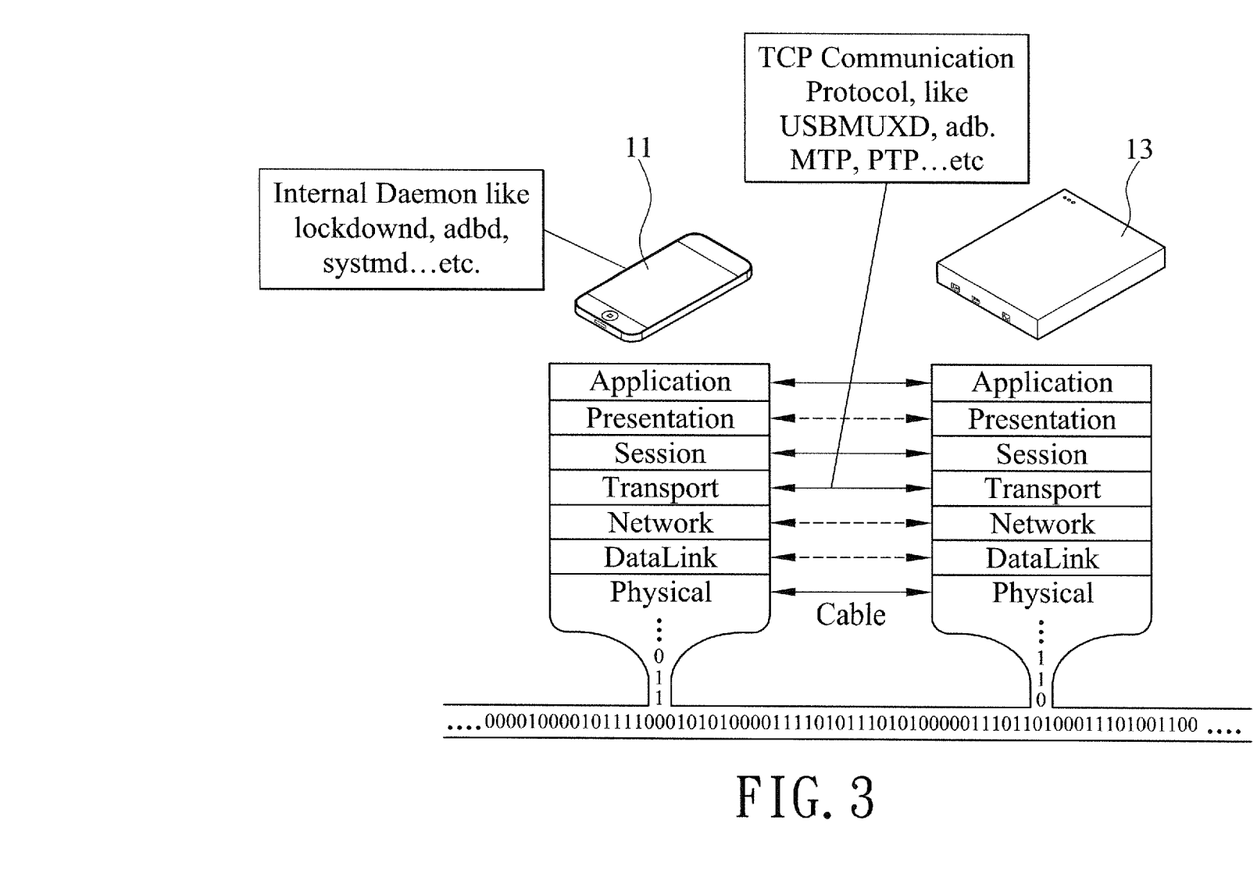
FIG. 3 is a flow chart of the system architecture of a preferred embodiment of the present invention.

With reference to FIGS. 1 and 2 and 3 for schematic views of the structure and system architecture of a Smartphone data backup and restoration system in accordance with a preferred embodiment of the present invention respectively, the Smartphone data backup and restoration system 1 comprises a Smartphone 11, a data transmission line 12 and a data backup and restoration apparatus 13.

The Smartphone 11 further comprises a first port 111 and a touch screen 112 disposed on the exterior of the Smartphone 11, and an operating system and a backup program installed in the Smartphone 11, wherein the touch screen 112 may be operated to run the backup program to issue a control command, and the touch screen 112 instantly shows an interactive status of the operation.

The data transmission line 12 has a first connector 121 and a second connector 122, wherein the first connector 121 is corresponsive to the first port 111 of the Smartphone 11. For example, if the Smartphone 11 adopts the iPhone OS (iOS) system, then the first port 111 can be a 30-pin connector or a 9-pin connector. If the Smartphone 11 adopts the Android system, then the first port 111 can be a MICRO USB connector or a MINI USB connector for electrically connecting the first connector 121 to the first port 111, and the data connection line 12 is provided for transmitting general digital data as well as transmitting electric power.

The data backup and restoration apparatus 13 is connected to an external power supply for use, and the power supply is the utility power of 110V/230V (AC/DC), and the data backup and restoration apparatus 13 of the present invention has an identification tag (ID tag) corresponding to the operating system, so that the data backup and restoration apparatus 13 and the operating system can be identified in the same operating system, and the data backup and restoration apparatus 13 is electrically coupled to the Smartphone 11 through the data transmission line 12. The data backup and restoration apparatus 13 comprises a housing 131, which is a rectangular housing with a containing space 1311 formed therein; a second port 132, installed on a surface of the housing 131, for electrically coupling the second connector 122 of the data connection line 12, and it is noteworthy that the second connector 122 is a USB connector; a microprocessor 133, installed in the containing space 1311, and electrically coupled to the second port 132, for performing a corresponding operation after receiving the control command; a data storage unit 134, installed in the containing space 1311, and electrically coupled to the microprocessor 133, for storing a verification program, and backup data coming from the Smartphone 11, wherein the data storage unit 134 is a hard disk or any high-capacity digital storage medium; a buffer unit 135, installed in the containing space 1311, and electrically coupled to the data storage unit 134 (133), for storing data temporarily during the operation of the microprocessor 133, and it is noteworthy that the buffer unit 135 is a dynamic random access memory (DRAM); and a display unit 136, installed on a surface of the housing 131, for displaying an operating status of the data backup and restoration apparatus 13 through of light signal, image or text after receiving the control command from the microprocessor 133, wherein the display unit 136 is an LED light source or an LCD display device. Except the housing 131, each component is installed on a printed circuit board in order to reduce the overall volume and lower the manufacturing cost.

In addition, the Smartphone data backup and restoration apparatus 1 of the present invention further comprises a reset switch 14 installed on a surface of the housing 131 and electrically coupled to the microprocessor 133, wherein the reset switch 14 is disposed on a side of the second port 132. After the reset switch 14 is pressed, a trusted connection is completed forcibly, while the backup job of the Smartphone 11 is being executed, and the backup data are duplicated into the data storage unit 134, wherein the reset switch 14 is a press-button switch or a push switch, so that a user can operate the Smartphone conveniently by pressing the switch.

With reference to FIG. 2 for a schematic view of the system architecture of a preferred embodiment of the present invention; of In the Smartphone data backup and restoration system 1 of the present invention, a physical layer is provided for electrically connecting the Smartphone 11 and the data backup and restoration apparatus 13 through the data transmission line 12, and the Smartphone 11 and the data backup and restoration apparatus 13 are identified and paired at a datalink layer and a network layer, and then a transport layer transmits the identification program to the Smartphone 11, and a trusted connection is completed according to a transmission control protocol such as USBMUXD, ADB, MTP and PTP at a session layer, and finally the Smartphone 11 carries out the operation of each command, and performs an operation such as a data backup or restoration at a presentation layer and an application layer according to the operation command.

Figure 4:
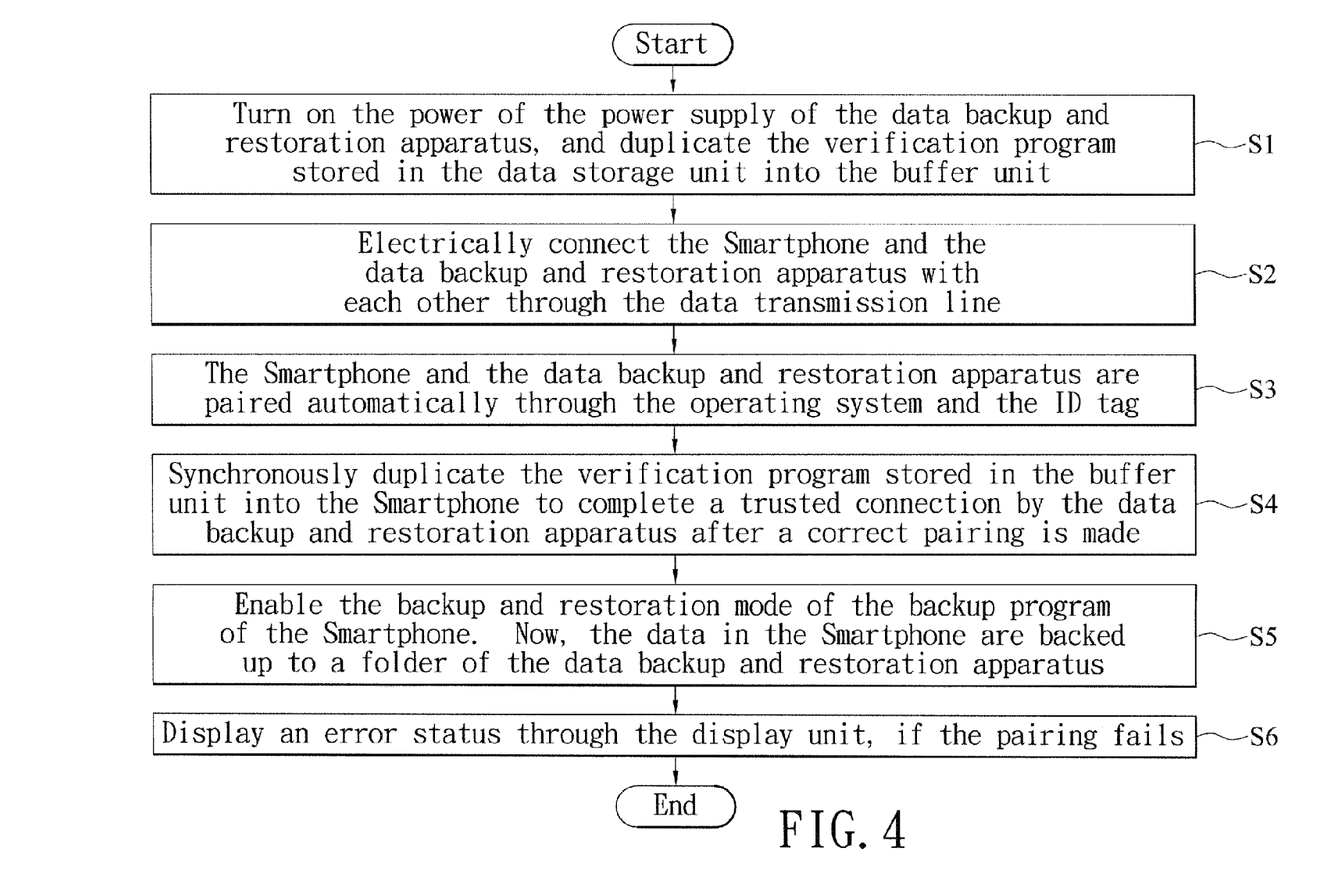
FIG. 4 is a flow chart of a data backup mode of the present invention.
Figure 5:
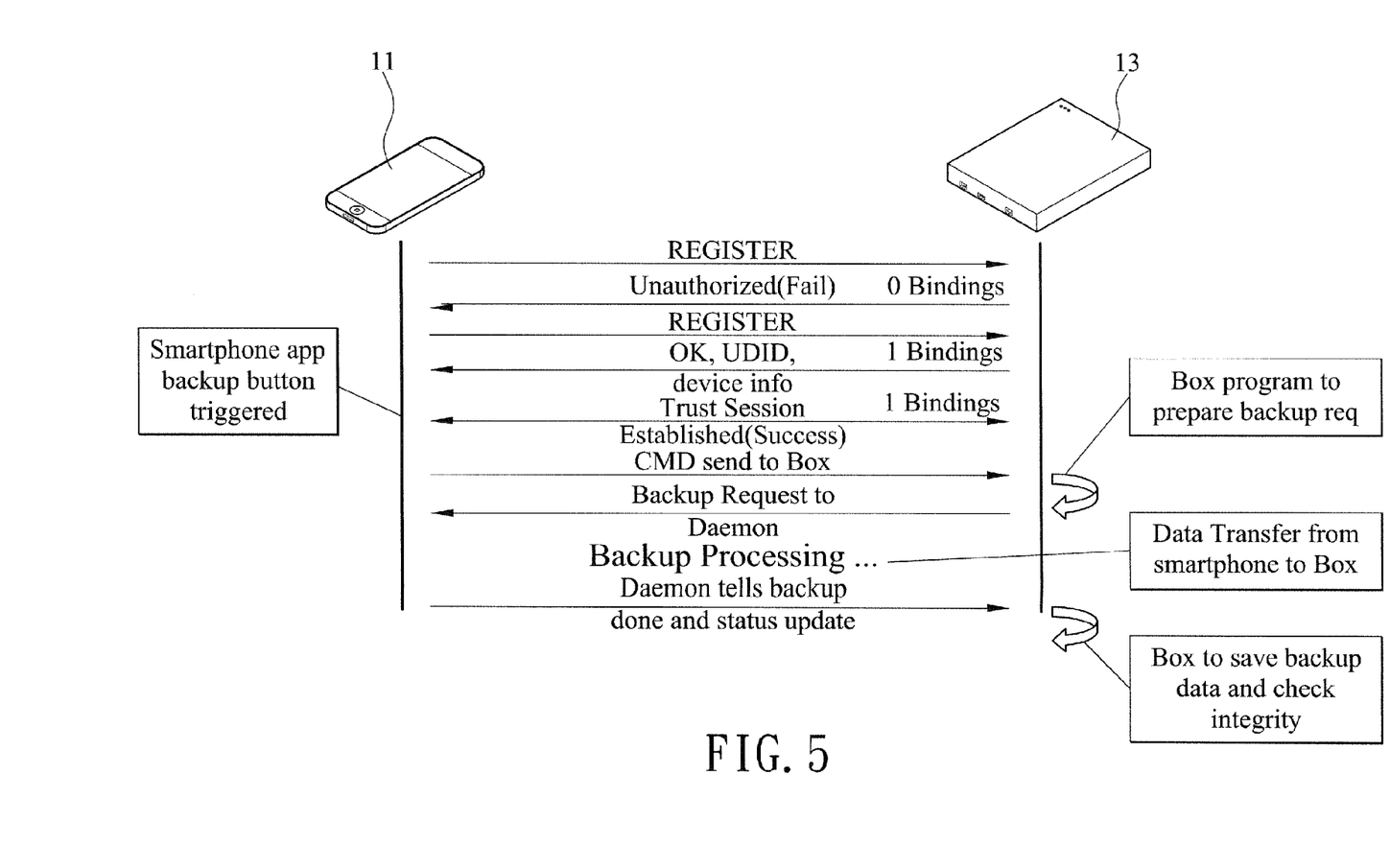
FIG. 5 is a schematic view of the system architecture at data backup mode of the present invention.

With reference to FIGS. 4 and 5 and 6 and 7 for the flow charts of a data backup mode and a data restoration mode of a preferred embodiment of the present invention respectively, FIGS. 4 and 5 shows a data backup process comprising the following steps:

Step 1: Turn on the power of the power supply 136 of the data backup and restoration apparatus 13, and duplicate the verification program stored in the data storage unit 134 into the buffer unit 135.

Step 2: Electrically connect the Smartphone 11 and the data backup and restoration apparatus 13 with each other through the data transmission line 12.

Step 3: The Smartphone 11 and the data backup and restoration apparatus 13 are paired automatically through the operating system and the ID tag.

Step 4: Synchronously duplicate the verification program stored in the buffer unit 135 into the Smartphone 11 to complete a trusted connection by the data backup and restoration apparatus 13 after a correct pairing is made.

Step 5: Enable the backup and restoration mode of the backup program of the Smartphone 11. Now, the data in the Smartphone 11 are backed up to a folder of the data backup and restoration apparatus 13.

Step 6: Display an error status through the display unit 136, if the pairing fails.

In the data backup process, the data backup and restoration apparatus 13 displays the current backup condition and status through the display unit 136 to let users know about the progress of the process. In the aforementioned backup flow, the microprocessor 133 of the data backup and restoration apparatus 13 may perform the data backup for one or more Smartphones 11. More specifically, the microprocessor 133 is multi-tasking and theoretically can be applied to a plurality of Smartphones 11 simultaneously.

After the aforementioned backup process, the data backup and restoration apparatus 13 creates a backup data folder for the corresponding Smartphone 11 and the folder is generally named as the current date, so that the folder name will not be repeated to allow users to store backup data of different time points. For instance, if the backup data folder of a corresponding Smartphone 11 is named as ABC, a backup data folder corresponding to the date and time will be generated in the folder ABC for each time of the backup.

Figure 6:
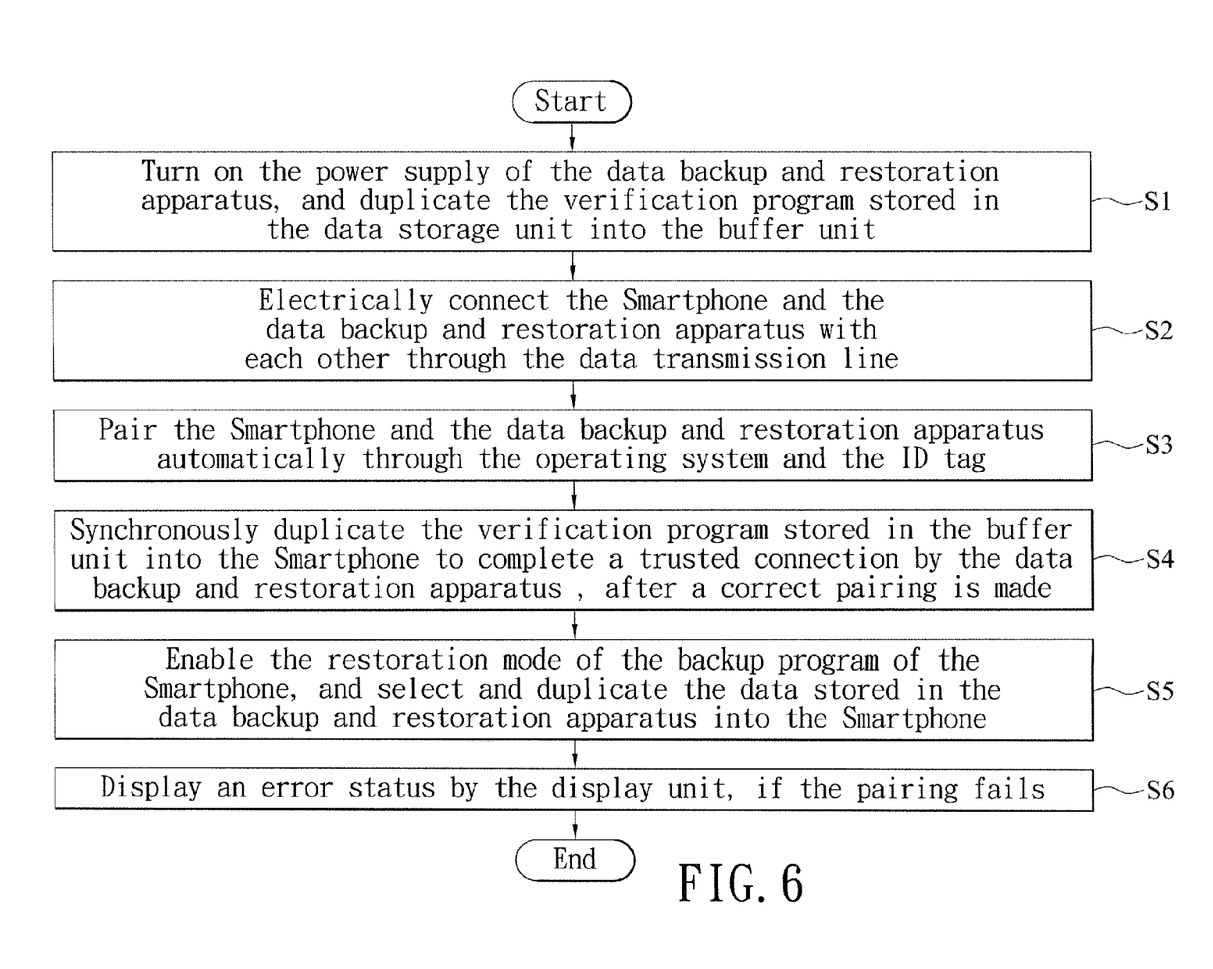
FIG. 6 is a flow chart of a data restoration mode of the present invention.
Figure 7:
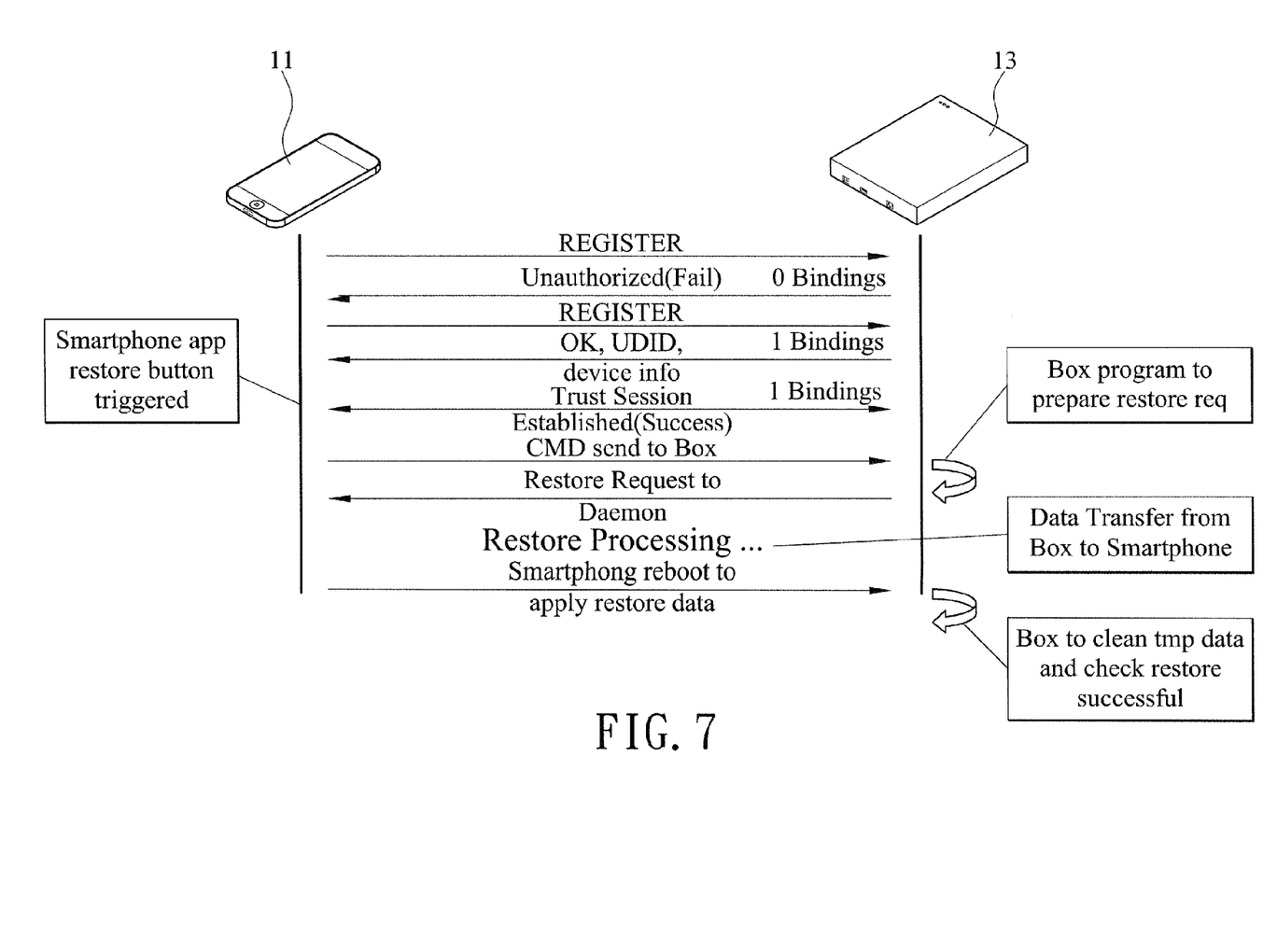
FIG. 7 is a schematic view of the system architecture at data restoration mode of the present invention.

Similarly, the procedure will be the same as shown in FIGS. 6 and 7, if a user wants to restore the backup data to the Smartphone 11, and this procedure takes place only after the trusted connection is completed. The details of the operation will not be repeated here. The touch screen 112 of the Smartphone 11 further displays the progress of restoring the data, and this procedure comprises the following steps:

Step 1: Turn on the power supply of the data backup and restoration apparatus 13, and duplicate the verification program stored in the data storage unit 134 into the buffer unit 134.

Step 2: Electrically connect the Smartphone 11 and the data backup and restoration apparatus 13 with each other through the data transmission line 12.

Step 3: Pair the Smartphone 11 and the data backup and restoration apparatus 13 automatically through the operating system and the ID tag.

Step 4: Synchronously duplicate the verification program stored in the buffer unit 135 into the Smartphone 11 to complete a trusted connection by the data backup and restoration apparatus 13, after a correct pairing is made.

Step 5: Enable the restoration mode of the backup program of the Smartphone 11, and select and duplicate the data stored in the data backup and restoration apparatus 13 into the Smartphone 11.

Step 6: Display an error status by the display unit 136, if the pairing fails.

Figure 8:
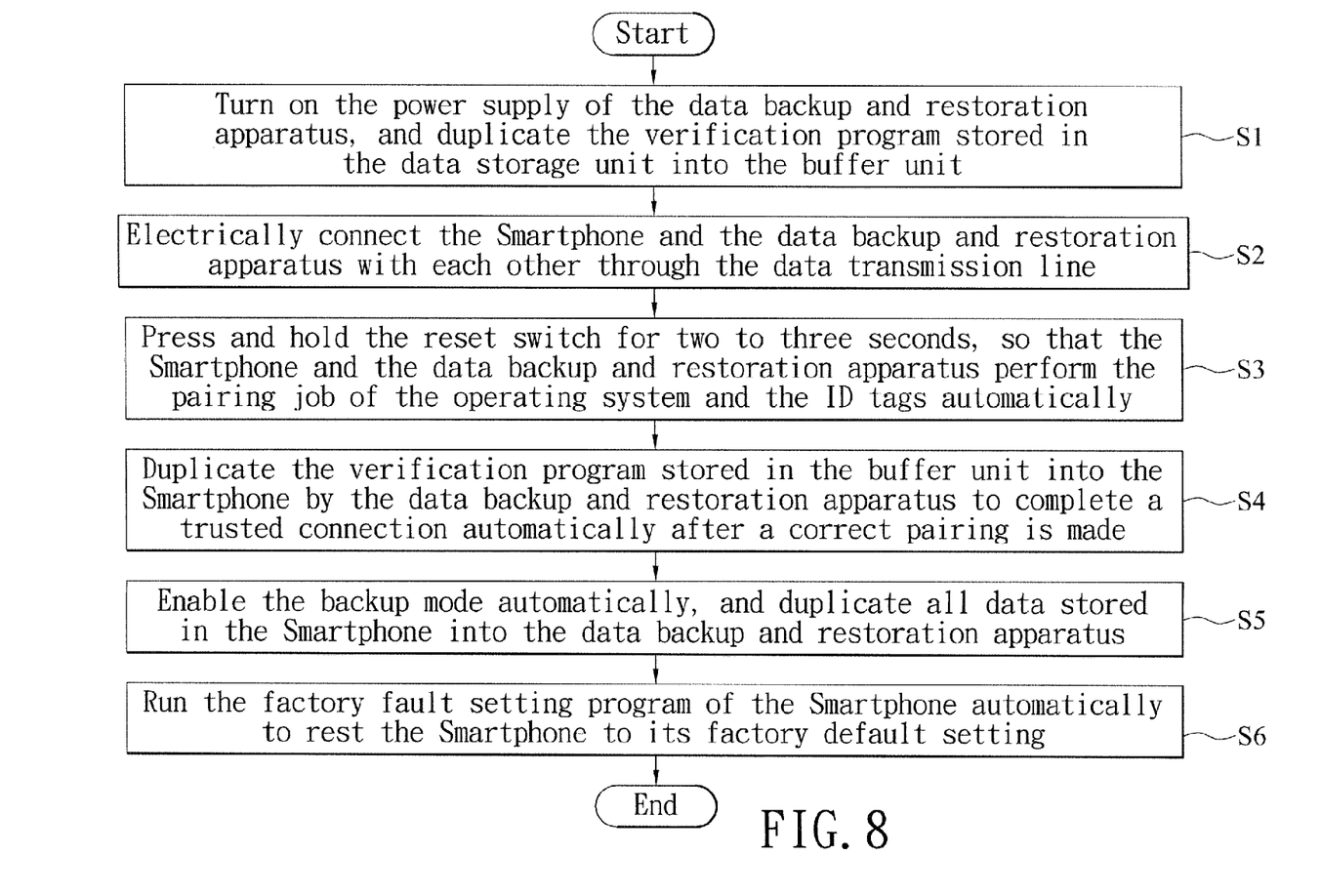
FIG. 8 is a flow chart of a repair mode of the present invention.

With reference to FIG. 8 for a flow chart of a repair mode of the present invention, the Smartphone 11 may be damaged and unable to operate and control the touch screen, so that the present invention further provides the design of the reset switch 14 as a solution to overcome this problem, wherein the reset switch 14 is combined with the automatic procedure of the pairing job to complete the trusted connection and backing up data, so as to simplify the original operation of the Smartphone 11 by using the reset switch 14 for the operation instead, wherein the reset switch 14 is pressed and held for two to three seconds in order to forcibly complete a trusted connection, while performing a backup job of the Smartphone 11, and the backup data are duplicated into the data storage unit 134. After the backup job is completed, the Smartphone 11 is reset to its factory default setting in order to prevent unauthorized persons from accessing the original data. The process of executing the repair mode comprises the following steps:

Step 1: Turn on the power supply of the data backup and restoration apparatus 13, and duplicate the verification program stored in the data storage unit 134 into the buffer unit 135.

Step 2: Electrically connect the Smartphone 11 and the data backup and restoration apparatus 13 with each other through the data transmission line 12.

Step 3: Press and hold the reset switch 14 for two to three seconds, so that the Smartphone 11 and the data backup and restoration apparatus 13 perform the pairing job of the operating system and the ID tags automatically.

Step 4: Duplicate the verification program stored in the buffer unit 135 into the Smartphone 11 by the data backup and restoration apparatus 13 to complete a trusted connection automatically after a correct pairing is made.

Step 5: Enable the backup mode automatically, and duplicate all data stored in the Smartphone 11 into the data backup and restoration apparatus 13.

Step 6: Run the factory fault setting program of the Smartphone 11 automatically to rest the Smartphone 11 to its factory default setting.

What is claimed is:

1. A Smartphone data backup and restoration system, comprising:
a Smartphone, having a first port and a touch screen, and further including an operating system and a backup program installed in the Smartphone, and the touch screen being operated, and the backup program being run to issue a control command to display an interactive status of an operation;
a data transmission line, having a first connector and a second connector, and the first connector being electrically coupled to the first port; and
a data backup and restoration apparatus, coupled to an external power supply for use, and having an identification tag corresponsive to the operating system, and coupled to the Smartphone through the data transmission line, and the data backup and restoration apparatus further comprising:
a housing, including a containing space therein;
a second port, formed on a surface of the housing, for electrically coupling the second connector of the data connection line;
a microprocessor, installed in the containing space, and electrically coupled to the second port, for performing a corresponding operation after receiving the control command;
a data storage unit, installed in the containing space, and electrically coupled to the microprocessor, for storing a verification program, and backup data coming from the Smartphone;
a buffer unit, installed in the containing space, and electrically coupled to the data storage unit, for storing data temporarily during the operation of the microprocessor;
a display unit, installed on a surface of the housing, and electrically coupled to the microprocessor, for instantly displaying an operating status of the data backup and restoration apparatus; the Smartphone when used being electrically coupled to the data backup and restoration apparatus through the data transmission line, while performing a pairing job of the operating system, the data backup and restoration apparatus synchronously duplicating the verification program to the Smartphone to complete a trusted connection as a primary measure of trusted connection, so that the backup program installed in the Smartphone can control the data backup and restoration apparatus to perform a backup or restoration job, and if the pairing fails, then the data backup and restoration apparatus will not take any action, but will simply show an error status of the operation through the display unit; and a reset switch installed on a surface of the housing and electrically coupled to the microprocessor, and the reset switch being disposed on a side of the second port, such that when the primary measure of trusted connection fails, activation of the reset switch functions as a secondary measure of trusted connection to establish trusted connection alternatively, while performing a backup job of the Smartphone, and duplicating the backup data into the data storage unit, wherein after the backup job is completed, the Smartphone is reset to factory default for data protection.

2. The Smartphone data backup and restoration system of claim 1, wherein the reset switch is a press-button switch or a push switch.

3. The Smartphone data backup and restoration system of claim 1, wherein the display unit is an LED light source or an LCD display device.

* * * * *